(12) United States Patent
Stevens et al.

(10) Patent No.: US 12,510,395 B2
(45) Date of Patent: Dec. 30, 2025

(54) CAPACITIVE SENSOR FOR DETERMINING A FLUID LEVEL IN A CONTAINER

(71) Applicant: MEDELA HOLDING AG, Baar (CH)

(72) Inventors: Natalie Stevens, McHenry, IL (US); Martin Thüring, Merenschwand (CH); James Keclik, McHenry, IL (US)

(73) Assignee: MEDELA HOLDING AG, Baar (CH)

( * ) Notice: Subject to any disclaimer, the term of this patent is extended or adjusted under 35 U.S.C. 154(b) by 521 days.

(21) Appl. No.: 17/974,462

(22) Filed: Oct. 26, 2022

(65) Prior Publication Data

US 2024/0142291 A1 May 2, 2024

(51) Int. Cl.
*G01F 23/263* (2022.01)
*A61M 1/06* (2006.01)

(52) U.S. Cl.
CPC .......... *G01F 23/266* (2013.01); *A61M 1/062* (2014.02); *G01F 23/268* (2013.01)

(58) Field of Classification Search
CPC .... G01F 23/266; G01F 23/268; G01F 23/265; A61M 1/062; A61M 1/06–0697; A61M 2205/33; A61M 2205/3327; A61M 2205/2279; A61M 1/80; A61M 1/06935; A01J 5/01
USPC .......................... 73/304 C, 290 R; 604/74–76
See application file for complete search history.

(56) References Cited

U.S. PATENT DOCUMENTS

| 2016/0047683 | A1* | 2/2016 | Winkens | G01F 23/268 |
| | | | | 73/304 C |
| 2017/0021068 | A1 | 1/2017 | Gaskin et al. | |
| 2018/0361040 | A1* | 12/2018 | O'Toole | A61M 1/062 |
| 2019/0328945 | A1 | 10/2019 | Analytis et al. | |
| 2020/0078503 | A1* | 3/2020 | Bartlett | A61M 1/062 |
| 2021/0055590 | A1* | 2/2021 | Otagaki | G01F 23/265 |

FOREIGN PATENT DOCUMENTS

| DE | 102018219561 A1 * | 12/2019 | ............. B60K 15/03 |
| EP | 3704998 A1 * | 9/2020 | |
| EP | 4292622 A1 * | 12/2023 | ............... A61B 5/00 |
| WO | WO-2018/229504 A1 | 12/2018 | |

* cited by examiner

*Primary Examiner* — Mark A Laurenzi
*Assistant Examiner* — Kelsey L Stanek
(74) *Attorney, Agent, or Firm* — MARSHALL, GERSTEIN & BORUN LLP

(57) ABSTRACT

This disclosure generally relates to a capacitive sensor for determining a fluid level in a milk container. In one embodiment, the capacitive sensor may be attached to a milk container of a breast pump device. The breast pump may include a breast shield adapted to at least in part receive a breast of a lactating user, an aggregate for generating suction for expressing milk from the breast, a milk container (4) providing a reservoir (26) for the expressed milk, a capacitive sensor (8) adapted to generate a signal indicative of the filling level within the reservoir (26) and a controller (12) for controlling the aggregate (14) and processing the signal of the capacitive sensor (8), wherein the capacitive sensor (8) includes at least two capacitive sensor elements (44, 46) having a different sensitivity to a change of the filling level and a similar sensitivity to a conductive object touching the milk container (4).

16 Claims, 2 Drawing Sheets

CAPACITIVE SENSOR FOR DETERMINING A FLUID LEVEL IN A CONTAINER

FIELD OF THE DISCLOSURE

This disclosure generally relates to a capacitive sensor for determining a fluid level in a container. In one embodiment, the capacitive sensor may be attached to a milk container of a breast pump. Such breast pump may include an aggregate coupled to the milk container to generate a suction effect in the milk container, wherein the milk container provides a reservoir for breast milk expressed from a human breast by suction generated by the aggregate and wherein the capacitive sensor is configured to monitor a filling level of breast milk in said reservoir. For this, the capacitive sensor provides a signal indicative of the filling level within the reservoir.

BACKGROUND

As described in US 2017/0021068 A1 and US 2019/0328945 A1, the capacitance of the capacitive sensor is typically proportional to a dielectric factor assigned to a liquid inside the container, wherein said dielectric factor varies due to a changing volume of liquid inside the milk container.

The breast pump has a breast shield adapted to at least in part receive a breast of a lactating user as generally know from US 2017/0021068 A1 and US 2019/0328945 A1. As described in those prior art documents, the breast pump comprises an aggregate for generating suction for expressing milk from the breast. Such aggregate may be part of a breast pump device which at least partially fits inside a bra as e.g. known from WO 2018/229504 A1. In such an embodiment, the aggregate is usually received within a housing which joins the aggregate and a controller of said aggregate, which controller is in data connection with the capacitive sensor and also the aggregate to control the aggregate depending on the sensor signal of the capacitive sensor.

The aggregate may be provided by a suction pump, which suction pump may be received within the housing. Alternatively, the aggregate may be formed by a motor providing e.g. a reciprocating movement of a membrane, which movement of the membrane provides a cyclic suction pressure. The membrane may be comprised within the housing. Alternatively, the membrane may be provided at an interface between any separate element of the breast pump or may be within the milk container. Plural membranes may be provided to separate the working fluid of such pump arrangement from the milk side.

In practical use the capacitance may vary not only because of a changing dielectric factor due to a changing volume of liquid inside the milk container and a correct assignment of a varying capacitance to a changing volume of liquid inside the milk container is difficult. For example, when a conductive object, such as a human hand, touches the milk container the conductive object influences the measurable capacitance. As a result, the dielectric factor of the liquid could be overestimated, thereby overestimating the liquid level in the milk container. Similar false results could occur when an inside of the reservoir wall above the actual fluid level gets wet. Further, tilting the milk container may reduce or enhance the effective liquid level at the capacitive sensor, thereby also leading to false results of the filing level of liquid in the milk container.

SUMMARY OF THE DISCLOSURE

It is therefore an object of this disclosure to provide a capacitive sensor for determining a fluid level in a milk container. It is a further object of this disclosure to provide a capacitive sensor for determining a fluid level in the milk container more accurately. Another object of this disclosure is to provide a capacitive sensor for determining a fluid level in a milk container more accurately by reducing or eliminating at least one systematic parasitic error.

In an embodiment, the capacitive sensor comprises at least two capacitive sensor elements having a different sensitivity to a change of the filling level of breast milk in said reservoir and a similar sensitivity to a conductive object touching the milk container. The capacitive sensor may comprise a first capacitive sensor element having a high sensitivity to a changing filling level of breast milk in said reservoir and a second capacitive sensor element having a low sensitivity to a changing filling level of breast milk in said reservoir, the first capacitive sensor element and the second capacitive sensor element having a similar sensitivity to a conductive object touching the milk container. Preferably, by comparing the signals generated by the first and the second sensor element, an influence of a conductive object touching the milk container on the capacitance within the capacitive sensor can be reduced or even eliminated. For this purpose, the controller may be provided for communicating with the capacitive sensor and for determining the filling level of breast milk in said reservoir by evaluating the sensor signals from the first capacitive sensor element and the second capacitive sensor element. Specifically, the controller can be configured to subtract the sensor signals of the second capacitive sensor element from the first capacitive sensor element.

In an embodiment, the capacitive sensor can comprise a third capacitive sensor element configured to project an electric field belonging to the first capacitive sensor element into the reservoir.

In an embodiment, the capacitive sensor can include an electric shield for preventing interferences between the first capacitive sensor element and the second capacitive sensor element. Preferably, the third capacitive sensor element is configured to provide respective electric shield.

In an embodiment, the capacitive sensor can include a ground potential for the first capacitive sensor element and the second capacitive sensor element.

In an embodiment, the milk container can comprise an outflow port for pouring breast milk from the reservoir into a different milk container. A reclosable lid may be provided for opening and closing the outflow port.

In an embodiment, the milk container can comprise a suction aperture that is sealed by a movable membrane to create a suction effect in the container.

In an embodiment, an accelerometer may be provided to detect tilting of the milk container. Preferably, the logic may be configured to determine a risk of spilling through at least one of an inlet port and an outflow port of the milk container by evaluating the signals of at least one of the capacitive sensor and the accelerometer.

In an embodiment, each of the capacitive sensor elements—in particular the first capacitive sensor element, the second capacitive sensor element, the third capacitive sensor element and the ground potential—may be formed as separate thin film or plate made of an electrode material, wherein the shape of each film or plate may be different. The capacitive sensor elements may be attached in a specific pattern to a common base material made of insulating material.

Preferably, the first capacitive sensor element is longish or at least has a longish first capacitive sensor segment. The longitude middle extension thereof usually is perpendicular to at least a longish sensor segment of the second capacitive sensor. This second capacitive sensor segment may extend perpendicular to the upper surface of the milk within the milk container in a usual use orientation of the milk container. The longish first capacitive sensor segment or the entire capacitive sensor element may extend preferably perpendicular to the second capacitive sensor element or a longish segment thereof. The usual use orientation of the milk container for an in bra pump may be provided by a constitution in which the breast shield or a nipple tunnel thereof receiving the nipple of the breast extends essentially horizontal, which provides a respective use orientation for the milk container. In case the milk container is provided separate from the breast shield and e.g. connected with said breast shield by tubing, the use orientation may be provided by a flat bottom of the separate milk container, which flat bottom surface is used to rest such milk container on a flat horizontal surface.

Practical experiments have proven that a preferred constitution of the first and the second capacitive sensor are advantageous to obtain different sensitivity for both of the sensor elements. The first capacitive sensor preferably has a longish first capacitive sensor segment which is arranged between two curved first capacitive end sections. The curvature of those end sections is opposite to the curvature of the curved first capacitive middle section. This middle section is usually curved upwards in the usual use orientation of the milk container. The two first capacitive end sections are usually formed identically. Preferably, the first capacitive sensor element has a symmetrical constitution such that identical surface portions of the first capacitive sensor exist on each side of a longitude null axis, which axis usually corresponds with the vertical axis in the usual use orientation of the milk container.

The second capacitive sensor element preferably has a longish second capacitive sensor segment which extends essentially perpendicular to the longish first capacitive sensor segment. This longish second capacitive sensor segment may be provided at a lateral edge of the first capacitive sensor element. To allow the provision of a central hole in the housing receiving the nipple tunnel. Moreover, the second capacitive sensor element may have a spiral second capacitive sensor segment arranged at an end of the longish second capacitive sensor segment, which end is furthest remote from the first capacitive sensor element. This spiral second capacitive sensor segment may be provided at a lower end of the longish second capacitive sensor segment. The spiral constitution may include straight and/or curved segment sections.

Preferably, the breast pump is provided as a breast pump device which at least fits inside a bra. Such breast pump device constitutes a unitary body which may be assembled of multiple elements which at least in part can be taken apart from each other. Such breast pump device preferably has a housing, which housing joins the aggregate, the controller and the capacitive sensor. On a regular basis, all portions of the capacitive sensor are joined by the housing. In particular, the aggregate, the controller and at least a part of the capacitive sensor are contained within said housing.

The housing preferably has a housing wall arranged next to the milk container. The capacitive sensor is at least in part joined with the housing wall. In other words, the capacitive sensor is at least suspended by or attached to the respective housing wall. In particular in a case in which the milk container can be disassembled from the housing, the capacitive sensor is preferably at least in part, preferably entirely provided at an inner face of the housing wall. In other words, the capacitive sensor is completely received within the housing.

In the embodiments, a reservoir wall and/or a milk container wall may be made of glass or plastic.

The capacitive sensor is preferably electrically coupled to conductive paths of a printed circuit board. This printed circuit board usually is received within the housing. To further shield the capacitive sensor, the housing preferably is arranged between the housing wall holding the capacitive sensor and a ground element, which ground elements preferably at least in part covers the printed circuit board. Such ground element may be provided by a conductive sheet metal element or foil, which may be directly adhered or attached to the printed circuit board. The printed circuit board thereby is sandwiched between the ground element and the capacitive sensor.

The accompanying drawings illustrate an embodiment of a capacitive sensor for determining a fluid level in a milk container of a breast pump.

BRIEF DESCRIPTION OF THE SEVERAL
VIEWS OF THE DRAWING

DETAILED DESCRIPTION OF THE
PREFERRED EMBODIMENTS

Reference will now be made in detail to the exemplary embodiment, an example of which is illustrated in the accompanying drawing.

Figure 1:
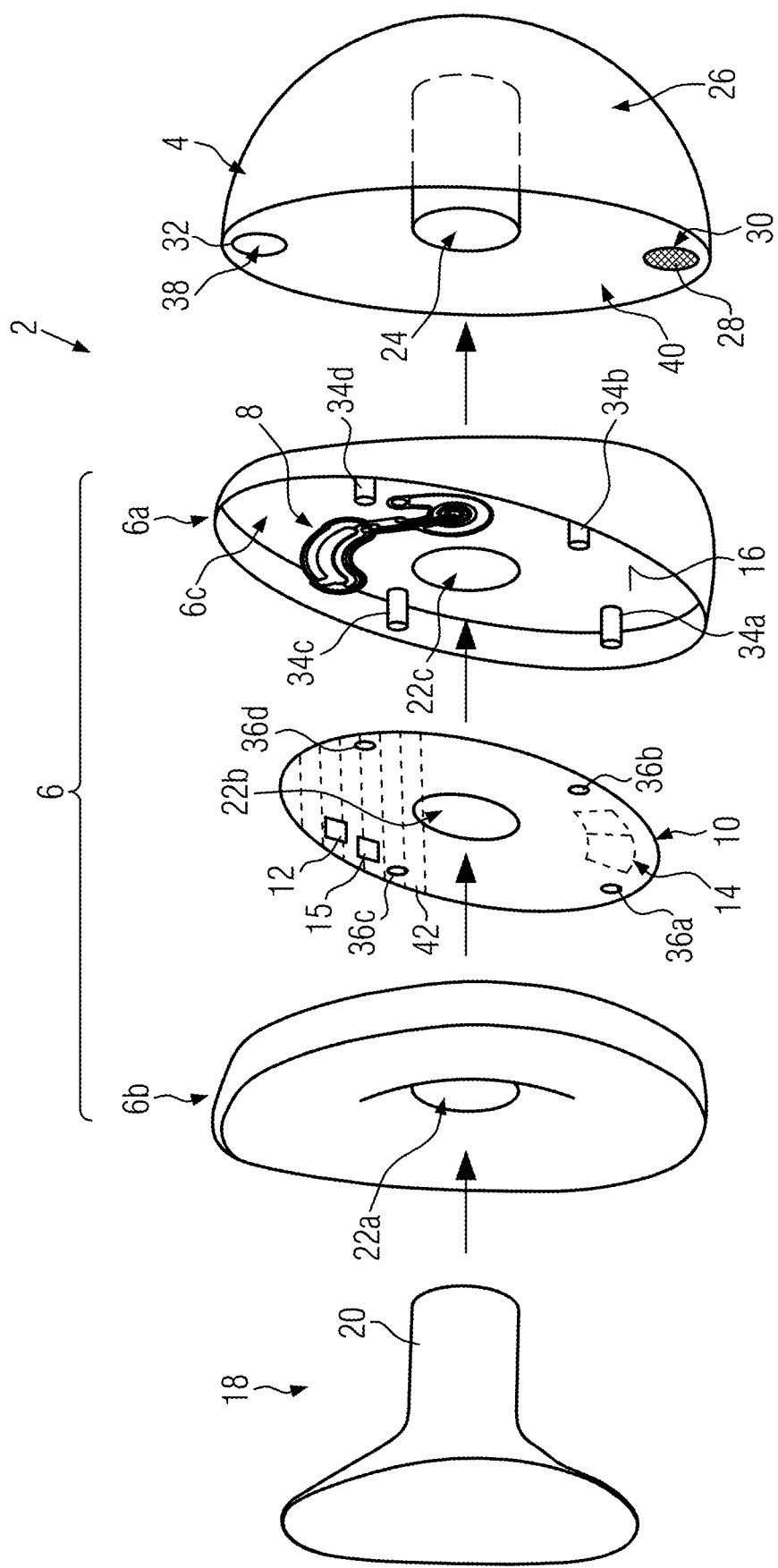
FIG. 1 illustrates schematically a breast pump in an exploded side view.

FIG. 1 illustrates a breast pump including a milk container 4, a housing 6 comprising a housing base 6a and a housing cap 6b, which housing 6 can releasably be coupled to the milk container 4. The housing base 6a forms a housing wall 6c.

The housing 6 furthermore contains a capacitive sensor 8 and a printed circuit board (PCB) 10. The PCB 10 is electrically connected to the capacitive sensor 8 and forms the basis of a controller 12. Reference numeral 14 identifies an aggregate in form of a motor. Reference numeral 15 identifies an accelerometer provided on the PCB 10 which accelerometer 15 is configured to detect tilting of the milk container 4. The aggregate 14 is provided between the PCB 10 and an inner face 16 of the housing base 6a. In a respective fashion, the capacitive sensor 8 is provided and connected to said inner face 16.

Reference numeral 18 identifies a breast shield having a nipple tunnel 20. Each of the housing base 6a, the housing cap 6b and the PCB 10 have a central hole identified with reference numerals 22a, 22b, 22c. When being connected to the housing 6, a receptacle 24 projecting into a reservoir 26 provided by said milk container 4 is aligned with the central bores 22a— c. After connecting the breast shield 18 to the housing 6 and/or the milk container 4, the nipple tunnel 20 of the breast shield 18 projects through the central holes 22a— c and into the receptacle 24.

Reference numeral 28 identifies a membrane which closes off a pumping chamber 30 defined by a removable lid 32 of the milk container 4. This pumping chamber 30 is in fluid communication with the receptacle 24, more specifically the nipple tunnel 20 usually via valves (not shown) provided between a bottom of the receptacle 24 and a front end of the nipple tunnel 20. This constitution provides just one example of an aggregate 14 for generating suction for expressing milk from a breast received within the breast shield 18.

When all components of the breast pump described above are joined, the same provides a breast pump device which at least in part can be provided within a bra of a user. In other words, the example of FIG. 1 is a hands-free breast pump device 2, which device 2 comprises all components of an electrically driven breast pump. Further details of such breast pump in particular contained within the housing 6 have been emitted as respective components are generally known to the expert e.g. from WO 2018/229504 A1.

Reference numeral 38 identifies an outflow port, which can be closed by a recloseable container lid 40. A vent opening may be provided in the container lid 40 or close to the outflow port 38. The accelerometer 15 is coupled with the controller 26, which is configured to determine a risk of spilling through any opening of the milk container, such as the outflow port or the vent opening. The controller 26 may be adapted to process the signal of the capacitive sensor 8 together with the signal of the accelerometer 15 indicative of the inclination in any direction to correct the measured volume with the or fill level of the milk container 4. For this, the controller 26 may comprise a look up table which correlates the measured fill level and the measured inclination of the milk container 4 with the actual fill level or volume.

The milk container 4 may be used as a storage for the expressed milk when the same is disassembled from other components of the breast pump. In this event, the outflow port 38 may hermetically seal the milk container 4.

FIG. 1 identifies mounting pins 34a, 34b, 34c, 34d which are provided within the housing 6 and configured to cooperate with mounting holes 36a, 36b, 36c, 36d of the PCB 10 and to hold the PCB 10 at a certain relative position with respect to the capacitive sensor 8.

The milk container 4 further comprises an outflow port 32 for pouring breast milk from the reservoir 10 into a different milk container 4. The outflow port 32 is closed by a reclosable lid 34 (not shown) for opening and closing the outflow port 32.

In FIG. 1, reference numeral 42 is to identify a ground element in form of a conductive sheet made of copper, which ground element 42 at least partially covers the surface of the PCB 10 covered by the housing cap 6b. This ground element 42 is to further shield and thus protect the capacitive sensor 8 for increasing the accuracy of the sensor signal.

The capacitive sensor 8 is configured to generate a signal indicated of the filling level within the reservoir 26. The capacitive sensor 8 may not necessarily provide exact information on the volume of expressed milk advanced into the reservoir 26. Further and due to possible inclination of the breast pump device during use, the accuracy of any sensor provided in a breast pump is governed with a certain degree of inaccuracy. The embodiment assumes that in normal use orientation of the milk container and thus the device the nipple tunnel 20 extends horizontally. In other words it is assumed, that the breast pump device is used by a lactating mother standing upright or sitting with a fairly upright torso such that the outflow port 38 is provided at the upper most section of the milk container 4 in the gravity field of the earth. The signal of the accelerometer 15 may be used to improve accuracy of the calculation of the controller 12 based on the signal of the capacitive sensor 8 by taking into account a signal of the accelerometer 15 indicative of any inclination of the breast pump device 2 in any direction.

Figure 2:
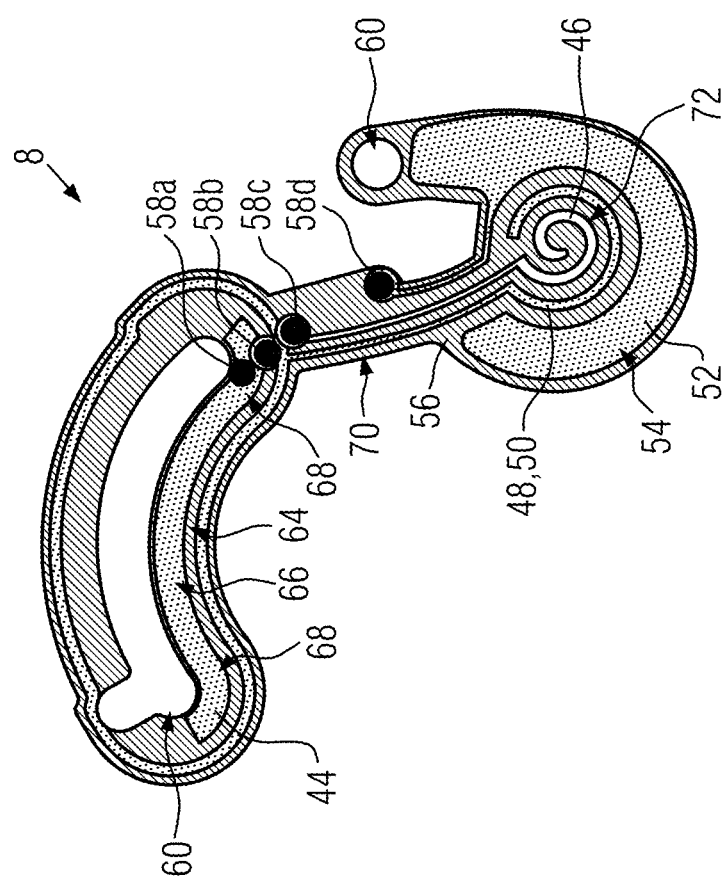
FIG. 2 illustrates the capacitive sensor elements of the capacitive sensor shown in FIG. 1.

FIG. 2 illustrates main components of the capacitive sensor 8, which has a first capacitive sensor element 44 having a high sensitivity to a changing filling level of breast milk in said reservoir 26 and a second capacitive sensor element 46 having a low sensitivity to a changing filling level of breast milk in said reservoir 26, wherein the first capacitive sensor element 44 and the second capacitive sensor element 46 have a similar sensitivity to a conductive object touching the milk container 4 and wherein the controller 12 communicates with the capacitive sensor 8 to determine the filling level of breast milk in said reservoir 26 by evaluating the sensor signals from the first capacitive sensor element 44 and the second capacitive sensor element 46. Typically, the user's hand can be a conductive object. Specifically, the controller 12 may be configured to subtract the signals of the second capacitive sensor element 46 from the signals of the first capacitive sensor element 44.

The capacitive sensor 8 further includes a third capacitive sensor element 48 configured to project an electric field belonging to the first capacitive sensor element 44 into the reservoir 26, the third conductive sensor element 48 being configured as an electric shield 50 for preventing interferences between the first capacitive sensor element 44 and the second capacitive sensor element 46.

The capacitive sensor 8 further includes a fourth capacitive sensor element 52 configured as a ground potential 54 for the first capacitive sensor element 44 and the second capacitive sensor element 46.

Each of the first, second, third and fourth capacitive sensor elements 44, 46, 48, 52 are formed as separate thin film or plate made of an electrode material, wherein the shape of each film or plate is different and each capacitive sensor element is attached in a specific pattern to a common base material 56 made of insulating material like polyimide. Specifically, the first capacitive sensor element 44 is formed in a shape essentially corresponding to a moustache and the second capacitive sensor element 46 is formed in a shape essentially corresponding to a tale of an ape. Reference numerals 58a-58b, identify a printed carbon pad, which is provided for each of the first to fourth capacitive sensor elements 44, 46, 48, 52 as contact points to pogo pins mounted to the PCB 10. The base material 56 has an elongate cutout 60 between the first capacitive sensor element 44 and the third capacitive sensor element 48, where the third capacitive sensor element 48 surrounds the first capacitive sensor element 44, and a circular cutout 60 near the fourth capacitive sensor element 52. The base material 56 may be a polyimide sheet and the first to fourth capacitive sensor elements 44, 46, 48, 52 may be provided as printed silver ink on said polyimide sheet.

In the present embodiment, the first capacitive sensor element 44 provides a longish first capacitive sensor segment 64. In fact, the first capacitive sensor element 44 is constituted of this longish first capacitive sensor segment 64. Respective segment 64 consists of a curved first capacitive middle section 66 and two curved first capacitive end sections 68. Respective sections 66, 68 have essentially the same thickness. They are each curved. As evident from FIG. 2, the curved first capacitive middle section 66 has a curvature projecting towards the top of the housing 6 in the normal use orientation whereas the curved first capacitive end sections are curved opposite and project toward the bottom of the housing 6 in a convex fashion. The first capacitive middle section 66 assumes at least 70% of the entire length of the longish first capacitive sensor element 64. The second capacitive sensor element 46 has a longish second capacitive sensor segment 70 extending essentially perpendicular to the longish first capacitive sensor segment 64 and thus the first capacitive sensor element 44. As evident from FIG. 2, the second capacitive sensor element 46 has this longish second capacitive sensor segment 70 and a spiral second capacitive sensor segment 72 arranged at an end of the longish second capacitive sensor segment 70. This end is the end furthers remote from the first capacitive sensor element 44.

As the first capacitive sensor element 44 has a high sensitivity to a changing filling level of breast milk in the reservoir 26 and a second capacitive sensor element 46 has a low sensitivity to a changing filling level of breast milk in said reservoir 26, while the first capacitive sensor element 44 and the second capacitive sensor element 46 have a similar sensitivity to a conductive object touching the milk container 4, the signals generated by the first and the second sensor element 44, 46 can be processed in the controller 12 to reduce or eliminate the influence of a conductive object touching the milk container 4 on the capacitance within the capacitive sensor. Thus, accuracy of the capacitive sensor 8 can be improved. The sensor elements 44, 46, 48, 52 and/or the shielding means 42, 50 and/or the accelerometer 15 per se and in particular in combination reduce or eliminate the influence of systematic a parasitic error on the determination of the fluid level within the milk container 4.

LIST OF REFERENCE NUMERALS 2 breast pump device
4 milk container
6 housing
6a housing base
6b housing cap
6c housing wall
8 capacitive sensor
10 PCB (printed circuit board)
12 controller
14 aggregate
15 accelerometer
16 inner face
18 breast shield
20 nipple tunnel
22a-22d central hole
24 receptacle
26 reservoir
28 membrane
30 pumping chamber
32 lid
34a-34d mounting pins
36a-36d mounting holes
38 outflow port
40 container lid
42 ground element
44 first capacitive sensor element
46 second capacitive sensor element
48 third capacitive sensor element
50 electric shielding
52 fourth capacitive sensor element
54 ground potential
56 base material
58a-58b printed carbon pad
60 elongate cutout
62 circular cutout
64 longish first capacitive sensor segment
66 curved first capacitive middle section
68 curved first capacitive end sections
70 longish second capacitive sensor segment
72 spiral second capacitive sensor segment

What is claimed is:

1. A breast pump including a breast shield adapted to at least in part receive a breast of a lactating user, an aggregate for generating suction for expressing milk from the breast, a milk container providing a reservoir for the expressed milk, a capacitive sensor adapted to generate a signal indicative of the filling level within the reservoir and a controller for controlling the aggregate and processing the signal of the capacitive sensor, wherein the capacitive sensor comprises at least two capacitive sensor elements having a different sensitivity to a change of the filling level and a similar sensitivity to a conductive object touching the milk container.

2. The breast pump according to claim 1, one of the capacitive sensor elements being a first capacitive sensor element that has a high sensitivity to a changing filling within said reservoir and another of the capacitive sensor elements being a second capacitive sensor element and having a low sensitivity to a changing filling level within said reservoir, and wherein the first and second capacitive sensor elements have a similar sensitivity to the conductive object touching the milk container.

3. The breast pump according to claim 2, wherein another of the capacitive sensor elements is configured to project an electric field belonging to the first capacitive sensor element into the reservoir.

4. The breast pump according to claim 2, wherein the capacitive sensor further includes an electric shield for preventing interferences between the first capacitive sensor element and the second capacitive sensor element.

5. The breast pump according to claim 2, wherein the capacitive sensor further includes a ground potential for the first capacitive sensor element and the second capacitive sensor element.

6. The breast pump according to claim 2, wherein the first capacitive sensor element has a first capacitive sensor segment extending parallel the upper surface of the milk within the milk container in a usual use orientation of the milk container.

7. The breast pump according to claim 6, wherein the second capacitive sensor element has a second capacitive sensor segment extending perpendicular to the first capacitive sensor segment.

8. The breast pump according to claim 7, wherein the second capacitive sensor element has a second capacitive sensor segment and a spiral second capacitive sensor segment arranged at an end of the second capacitive sensor segment which is furthest remote from the first capacitive sensor element.

9. The breast pump according to claim 2, wherein the first capacitive sensor element has a curved first capacitive middle section arranged between two curved first capacitive end sections, wherein two curved first capacitive end sections have a curvature opposite to the curvature of the curved first capacitive middle section.

10. The breast pump according to claim 2, wherein the first capacitive sensor element has a first capacitive sensor segment extending parallel the upper surface of the milk within the milk container in a usual use orientation of the milk container, wherein the second capacitive sensor element has a second capacitive sensor segment and a spiral second capacitive sensor segment arranged at an end of the first capacitive sensor segment which is furthest remote from the first capacitive sensor element.

11. The breast pump according to claim 1, further comprising an accelerometer configured to detect tilting of the milk container, wherein the controller configured to determine a risk of spilling through at least one of an inlet port and an outflow port of the milk container by evaluating the signals of at least one of the capacitive sensor and the accelerometer.

12. The breast pump according to claim 1, wherein each of the capacitive sensor elements is formed as a separate thin film or plate made of an electrode material.

13. The breast pump according to claim 1, further comprising a housing, which together with the milk container and the milk container defines a breast pump device which at least in part fits inside a bra, wherein the housing joins the aggregate, the controller and the capacitive sensor.

14. The breast pump according to claim 13, wherein the housing defines a housing wall arranged next to the milk container and wherein the capacitive sensor at least in part is joined with the housing wall.

15. The breast pump according to claim 14, wherein the capacitive sensor at least in part is provided at an inner face of the housing wall.

16. The breast pump according to claim 15, wherein the controller has a printed circuit board electrically connected with the capacitive sensor and received within the housing and wherein the printed circuit board is arranged between the housing wall and a ground element.

\* \* \* \* \*